United States Patent [19]

Oliver

[11] 4,430,464

[45] Feb. 7, 1984

[54] PAVEMENT BINDER COMPOSITION

[75] Inventor: John W. H. Oliver, Glen Iris, Australia

[73] Assignee: Australian Road Research Board, Victoria, Australia

[21] Appl. No.: 335,815

[22] Filed: Dec. 30, 1981

[30] Foreign Application Priority Data

Apr. 1, 1981 [AU] Australia .............................. PE8261

[51] Int. Cl.³ ............................................ C08L 95/00
[52] U.S. Cl. ................................... 524/59; 523/172; 524/70; 524/71
[58] Field of Search .......................... 524/59; 523/172; 106/281

[56] References Cited

U.S. PATENT DOCUMENTS 2,853,742  9/1958  Dasher ................................. 264/349
3,930,100 12/1975  McDonald et al. ................ 523/172
4,069,182  1/1978  McDonald ............................ 524/59

Primary Examiner—Theodore Morris
Attorney, Agent, or Firm—Cushman, Darby & Cushman

[57] ABSTRACT

An improved pavement binder composition comprises a digestion of rubber particles of low bulk density, preferably of the porous nodular surface morphological type, in a bituminous material.

12 Claims, 4 Drawing Figures

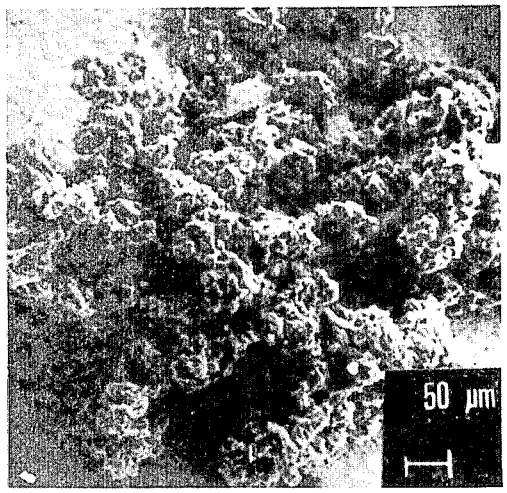
FIG. 1  Electron micrograph of new car tyre buffings.
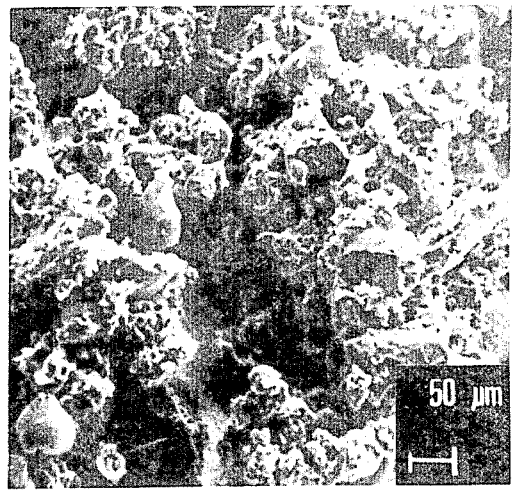
FIG. 2  Electron micrograph of 100%SBR tyre rubber, laboratory rasped.
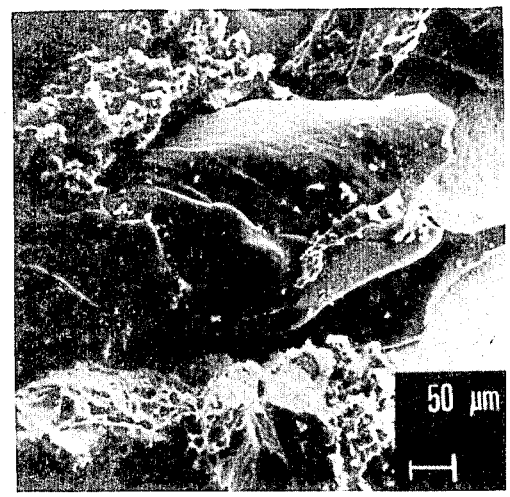
FIG. 3  Electron micrograph of 100%SBR tire rubber, laboratory drilled.
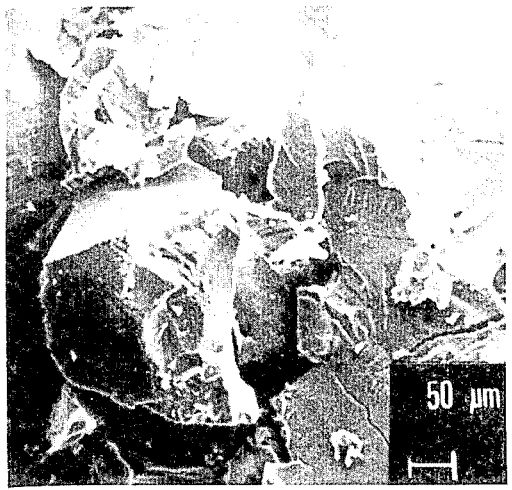
FIG. 4  Electron micrograph of 100%SBR tire rubber, cryogenically crushed.

PAVEMENT BINDER COMPOSITION

This invention relates to improvements in paving binder compositions, particularly to compositions used as a binding agent in the surface layer or other layers of pavements including roads, airfields and the like.

Rubber modifiers have been used in bituminous materials for many years. They have usually been specially prepared natural and synthetic rubbers and their concentration has been limited to less than 5 percent by mass of the asphalt cement (asphalt) because greater concentrations have given problems in handling (pumping and spraying) and because of their high cost. At these concentrations the improvement in binder performance obtained in the pavement service situation has been marginal unless a satisfactory polymer network has been formed in the asphalt.

An improvement in this situation occurred on introduction of the use of digestions of scrap rubber in asphalt containing up to 25 percent by mass of comminuted tire rubber. A sprayed layer of this material has been widely used in the U.S. to prevent cracks in the substrate being reflected through overlays. It is normally applied as either a chip seal surface treatment, with approximately 20 percent rubber added to the asphalt commonly known as a stress absorbing membrane, or as an interlayer of rubber/asphalt binder and aggregate (stress absorbing membrane interlayer) which is overlaid by a thin course of asphaltic concrete.

In Australia, the main use of the scrap rubber/asphalt digestions has been in sprayed surface treatments where the advantages are considered to be:
(a) The sealing of cracked pavements to prevent, or delay the onset of, reflection cracking, and additionally
(b) The retention of chips in hot weather under severe traffic stress conditions. Such conditions occur where seals are used to provide surface texture on high speed roads where a conventional asphalt seal is unable to provide satisfactory stone retention at bends or in acceleration and deceleration areas.

Investigations which have been conducted into the modification of asphalt by scrap rubber have now revealed that the gross morphology of the rubber particles is possibly the most important factor affecting the elastic properties of the rubber/asphalt digestions, and that significant advantages may be attained by the use of rubber particles of appropriate morphology.

According to the present invention, there is provided a paving binder composition comprising a digestion of rubber particles in a bituminous material, characterised in that said rubber particles are particles of low bulk density.

The bulk of the rubber granulate used for digestion in asphalt in Australia is the material produced during the preparation of used tires for retreading. A series of rotating saw blades contact the tread area of the tire and the buffings are drawn off by a vacuum system. Normally the buffings are a mixture of natural (from truck) and synthetic (from passenger cars) rubbers, with the latter predominating. Products from other comminution processes are available. One of these is the cryogenic method which involves hammer milling or grinding of the rubber after it has been cooled with liquid nitrogen. At a sufficiently low temperature the rubber behaves as a brittle solid.

It has been found that the comminution process used in the manufacture of the rubber particles has a significant effect on the morphology of the product particles. Thus, examination in the scanning election microscope of the particles produced by the cryogenic method shows that these particles are characterised by smooth surfaces, as illustrated by way of example in FIG. 4. Particles of this morphological type are found to have a high bulk density. In contrast, rubber particles produced by low speed rasping, grinding or similar processes are found on examination to be characterised by being porous and/or having a surface which is covered in porous, "sponge like" nodules. FIGS. 1 and 2 illustrate particles of this morphological type. These particles are found to have a very low bulk density. Particles with intermediate morphology generally have either a smooth surface with some porous nodules attached or are a mixture of smooth and porous and/or nodular-surfaced particles. An example of this intermediate morphology is illustrated in FIG. 3. The particles shown in FIGS. 1 to 4 all passed a 600 $\mu$m sieve and were retained on a 300 $\mu$m sieve when sieved dry.

Further investigation of these different morphological types has led to the establishment of tests for the parameters of "bulk density" of the particles and "elastic recovery" of the rubber/asphalt digestion, whereby rubber particles suitable for use in the present invention may be distinguished from particles which are not suitable. Details of these tests are set out hereunder.

A. Determination of the Bulk Density of Rubber Particles.

This test determines the bulk density in water of comminuted scrap rubber in the particle size range 600 to 300 $\mu$m.

In general, the rubber particles are stirred in boiling water to remove entrapped air and an anionic wetting agent is then added to the mixture. After further stirring, the particles are allowed to settle and their bulk volume is determined.

The following material is required:
Anionic wetting agent solution, prepared by diluting a "detergent concentrate" such as "Teepol" by adding 9 parts by volume of water to 1 part of detergent.

The following special apparatus is required:
(a) Test sieves—of nominal 200 mm diameter, fitted with woven wire cloth having an aperture of 300 $\mu$m and 600 $\mu$m and conforming to the requirements of Australian Standard 1152—Test Sieves.
(b) Riffle Box—consisting of an even number of rectangular chutes (about ten) discharging alternatively on opposite sides of the box, suitable for fine aggregate and similar to that specified in FIGS. 2,4,6 of Australian Standard 1141—Sampling and Testing Aggregates.

For bulk samples of less than 1 kg mass a sub-sample is obtained by pouring the bulk sample evenly over the top of the riffle box and thus dividing it into two representative parts, which are collected in boxes placed beneath the chutes. The contents of one box is then divided into two by further riffling and the process repeated until a sub-sample of suitable size (20 to 25 g) for sieving is obtained. For bulk samples greater than 1 kg mass, a sample less than 1 kg is obtained by a systematic sample reduction procedure such as that used for fine mineral aggregates and as described in AS 1141.

The sample so obtained is treated as previously described.

The test procedure is as follows:
(a) Air dry the sub-sample.
(b) Clean and dry the test sieves.
(c) Add no more than 25 g of the rubber sub-sample to the 600 μm sieve and shake as described in AS 1141, section 11.5. Check whether the mass of material retained on the 300 μm sieve exceeds 20 g. If it does, divide the material in two as described above and resieve on the 300 μm sieve only for at least 2 minutes. If there is less than 7.5 g of material on the 300 μm sieve, then it should be mixed thoroughly with a second lot of sieved material obtained as described above.
(d) Weigh into a clean, dry 250 ml beaker 7.5 g of the material retained on the 300 μm sieve.
(e) Add 70 ml of tap water and bring to the boil on a hotplate. (Note in hard water areas distilled or deionised water shall be used.)
(f) Allow to boil for 30 minutes stirring occasionally with a stirring rod and washing down particles deposited on the walls with water from a wash bottle. Keep the total volume of material in the beaker between about 60 ml and 70 ml.
(g) At the end of the 30 minute period, transfer the contents of the beaker to a 100 ml measuring cylinder using the wash bottle as required and make up to 100 ml with water from the wash bottle. Add 10 ml of diluted wetting agent solution and thoroughly agitate the contents by stirring in a circular motion. Reverse the direction of stirring to stop rotation of the suspension and allow to remain undisturbed for 15 minutes.
(i) Measure the settled volume of the rubber particles to the nearest 0.5 ml, neglecting any still floating.

Calculate the bulk density of the test portion by the following formula:

$$\text{Bulk density} = \frac{7.5}{V} \times 1000 \text{ kg/m}^3$$

where V = settled volume of the rubber particles, in milliliters.

The test result is reported as the mean of two determinations, made on separate sub-samples, to the nearest whole number.

B. Determination of the Elastic Recovery of a Rubber/Bitumen Digestion

Laboratory digestion is used to simulate the heat treatment applied prior to spraying of the product in road or other construction operations. (In Australia, this normally takes the form of circulation of the materials in an asphalt sprayer at about 200° C. for between 30 minutes and one hour.) The laboratory digestion procedure requires that the rubber sample be dried in a vacuum oven prior to addition to the hot bitumen in a reaction flask maintained at the desired temperature. The mixture is continuously stirred and samples withdrawn and cast when hot into sliding plate rheometer test moulds. An extensively modified sliding plate rheometer is used to measure the deformation properties (creep in shear) of the binder specimens.

To test a sample, a mass of 20 g is applied to a 10 mm thick specimen until a strain of 1.0 is obtained. The load is then removed and the sample permitted to recover under a "no load" condition. Movement of the free plate is recorded using a displacement transducer. In the "no load" condition, compensation is made to balance the mass of the free plate.

The parameters calculated for analysis are "time under stress" (i.e. time to reach a strain of 1.0) and "percent 'elastic' recovery" (defined as percentage of this strain recovered when the load is removed and after a recovery period of 10 times the straining period). "Time under stress" can be regarded as a simple measure of resistance to deformation at the test temperature (60° C.), while "elastic recovery" is an indication of the elastic component of this deformation.

Normally a particular rubber/asphalt combination is digested for 2 hours in the reaction vessel at a controlled temperature. Samples are removed for testing after digestion for 0.5, 1 and 2 hours. Three specimens are prepared from material removed after each digestion time and a test result is the mean value obtained for these three specimens.

Results obtained for a number of rubbers relating the percent elastic recovery and bulk density, show that there is a strong correlation between particle morphology (as measured by the bulk density test) and the elastic recovery of the rubber/asphalt digestion. The desirable condition, for pavement service, is for the rubber/asphalt digestion to show a high value of elastic recovery, and the tests performed establish that this is associated with low bulk density of the original rubber particles.

Accordingly, the present invention provides a composition in which the rubber particles included in the composition are of low bulk density. Such particles are of the porous nodular surface morphological type and preferably are substantially free of smooth surfaces. Disintegration of the bulk rubber by tearing it apart at near ambient temperatures so that stretching of the rubber takes place before fracture is the preferred method of producing these particles of low bulk density. Grinding and low speed rasping are two examples of methods by which this type of disintegration may be performed. Alternatively, the particles of low bulk density may comprise particles prepared by the so-called "Gould" process (U.S. Pat. No. 4,049,588 to Lee et. al.). Preferably, the particles used in the composition of this invention have a maximum bulk density (as measured by the above described test) of approximately 350 kg/m³ (more preferably a maximum of approximately 200 kg/m³), and the composition has an elastic recovery (as measured by the above described test: 0.5 h digestion at 200° C. of 15 percent by mass rubber in the rubber/asphalt of at least 15 percent (more preferably at least 25 percent).

As previously described, conventional rubber modifiers are used in amounts of up to 25 percent by mass of the total rubber/asphalt digestion, with higher amounts in this range (up to 25 percent) being used for sealing over cracks in the substrate, and lower amounts in the range (up to 15 percent) being used for promotion of stone or aggregate retention under traffic use. Similar amounts of rubber particles of low bulk density may be used in the composition of the present invention for similar purposes and generally better results will be achieved; however it should be noted that the improved properties obtained through use of these rubber particles enable lesser amounts of rubber particles to be used to achieve similar results to the conventional modifiers. Therefore in accordance with this invention, the rubber particles are preferably included in the composition in an amount of from 10 to 25 percent, more preferably about 15 percent, by mass. Typically, the particle size of the rubber particles may be of the order of up to 1.18 mm or greater, however it is preferred that the rubber particle size be no greater than 600 μm, preferably no greater than 300 μm.

Conventional bituminous materials may be used in the compositions of this invention, and differing grades of material may be used. By way of example only, Class 170 (or 85/100 penetration grade) asphalt may be used. Tests have been successfully completed using two types of asphalt representative of Australian production both of Class 170 (85/100 penetration) grade. The first of these was the vacuum distillation residue from Kuwait crude petroleum, air blown to grade, while the second, which was more aromatic in character, was a blend of the vacuum distillation residue from a Kuwait crude petroleum and the propane precipitated asphalt from this residue.

The digestion of the rubber particles in the bituminous material may be effected in accordance with known parameters of temperature and time, for example at a temperature in the range of from 160° C. to 240° C., preferably from 180° C. to 220° C., and for a period of from 0.5 hr. to 2 hr., preferably from 1 hr. to 2 hr.

It has been found that digestions of natural rubber are superior to those of synthetic rubber alone or those containing blends of synthetic and natural rubber, and accordingly the use of natural rubber alone is particularly preferred, although for economic reasons the use of blends of synthetic and natural rubber may be more desirable.

Additives may also be included in the composition of this invention, including a "cutter" such as a material in the kerosene boiling range to improve the spraying performance of the composition, and/or a "fluxing agent" in the diesel oil boiling range.

As previously described, the rubber particles may be prepared from both natural and synthetic (for example styrene-butadiene rubber) bulk stock, particularly from vehicle tires, although rubber from other sources such as conveyor belting may also be used.

The following table indicates the properties of rubber particles of low bulk density and compositions containing them in accordance with this invention, in comparison with the properties of particles and compositions not in accordance with the invention.

| RUBBER PARTICLES: MATERIAL AND PRODUCTION PROCESS | RUBBER PARTICLES: GROSS MORPHOLOGY | ELAS-TIC* RECOVERY (%) | BULK DENSITY (kg/m³) |
|---|---|---|---|
| New car tire grindings, by-product of tire testing. See FIG. 1 | Particle surface completely covered with porous nodules. | 46 | 140 |
| 100% styrene-butadiene, cured tire feedstock hand rasped. See FIG. 2. | As above but with some rounded nodules. | 30 | 190 |
| 100% styrene-butadiene, cured tire feedstock laboratory drilled. See FIG. 3. | Generally smooth rounded particles with a few porous nodules attached. | 17 | 230 |
| 100% styrene-butadiene, cured tire feedstock embrittled in liquid nitrogen and crushed. See FIG. 4. | Smooth faced, angular, cracked particles. | 3 | 390 |

*15% by mass rubber in air blown asphalt digested at 200° C. for 0.5 h.

Whilst particular preferred features of the present invention have been described herein by way of illustration of the present invention, it will be appreciated that many modifications and variations may be made thereto without departing from the spirit and scope of the present invention as broadly described herein.

I claim:

1. A pavement binder composition comprising a digestion of rubber particles in a bituminous material, characterised in that said rubber particles are of the porous nodular surface morphological type which are substantially free of smooth surfaces, and in that said particles have a maximum bulk density of 200 kg/m³.

2. A pavement binder composition according to claim 1, characterised in that said composition has an elastic recovery of at least 15 percent.

3. A pavement binder composition according to claim 2, characterised in that said composition has an elastic recovery of at least 25 percent.

4. A pavement binder composition according to claim 1, characterised in that said rubber particles comprise from 10 to 25 percent by mass of said composition.

5. A pavement binder composition according to claim 4, characterised in that said rubber particles comprise about 15 percent by mass of said composition.

6. A pavement binder composition according to claim 1, characterised in that said rubber particles have a particle size no greater than 600 μm.

7. A pavement binder composition according to claim 6, characterised in that said rubber particles have a particle size no greater than 300 μm.

8. A pavement binder composition according to claim 1, characterised in that said bituminous material is Class 170 (85/100 penetration) grade bitumen.

9. A pavement binder composition according to claim 1, characterised in that said rubber particles of low bulk density are particles produced by grinding or low speed rasping of bulk rubber stock.

10. A method of preparing a pavement binder composition according to claim 1, which comprises digesting rubber particles of low bulk density in a bituminous material at a temperature in the range of 160° C. to 240° C. for a period of from 0.5 hr. to 2 hr.

11. A method of preparing a pavement binder composition according to claim 10, wherein said digestion is performed at a temperature in the range of 180° C. to 220° C. for a period of from 1 hr. to 2 hr.

12. A pavement binder composition comprising a digestion of rubber particles in a bituminous material, said rubber particles being of the porous nodular surface morphological type which are substantially free of smooth surfaces.

* * * * *